Feb. 4, 1930.   G. R. METCALF, JR   1,745,941
CONDUIT FITTING
Filed April 4, 1928

George R. Metcalf Jr. INVENTOR.

BY

ATTORNEY.

Patented Feb. 4, 1930

1,745,941

UNITED STATES PATENT OFFICE

GEORGE R. METCALF, JR., OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed April 4, 1928. Serial No. 267,434.

This invention is designed to form a convenient means for connecting conduits with conduit boxes, particularly knock-out boxes and is particularly applicable to threadless conduits. Features and details of the invention will appear from the specification and claims.

A preferred embodiment of the invention is illustrated in the accompanying drawings as follows:—

Figure 1:
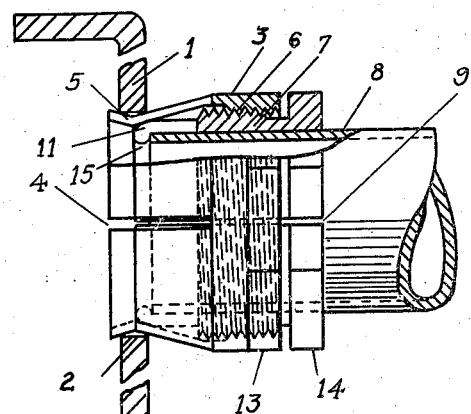

Fig. 1 shows an elevation of the device, partly in section.

Figure 2:
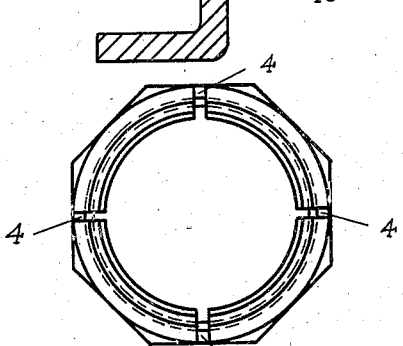

Fig. 2 an end view of an expanding sleeve adapted to fit in a knock-out box opening.

Figure 3:
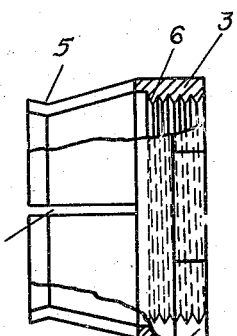

Fig. 3 a side elevation, partly in section, of such expanding sleeve.

Figure 4:
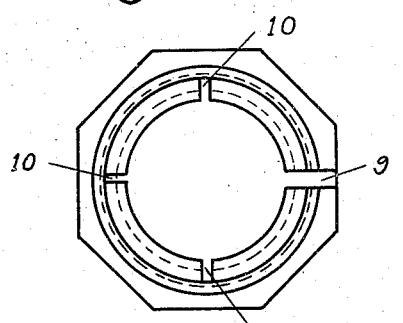

Fig. 4 an end view of a contracting sleeve.

Figure 5:
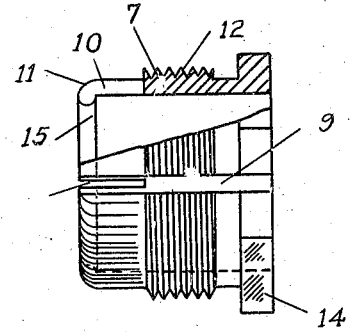

Fig. 5 a side elevation of the same, partly in section.

1 marks a fitting box, as for instance, the wall of a knock-out box. It is provided with an opening 2.

The inner end of an expanding sleeve 3 has slots 4 and it is provided with a groove 5, the walls of which engage the walls of the opening 2. The forward end of the sleeve is tapered on its inner periphery and it is provided with an internal screw thread 6 at its outer end.

A contractible sleeve 7 is arranged within the expansible sleeve 3 and is adapted to engage a threadless conduit 8. This contractible sleeve is made contractible by a slot 9 extending entirely through it and a series of slots 10 which lead from the inner end outwardly. The inner end is rounded, or provided with a wedging surface 11 adapted to engage against the tapered interior surface of the expanding sleeve. It is provided with a screw thread 12 engaging the screw thread 6. The sleeves are provided with the wrench-holds 13 and 14.

The expanding sleeve is put in place in the opening and the contracting sleeve is entered in the expanding sleeve and the conduit put in place. As the sleeves are turned and moved relatively the contracting sleeve is forced against the tapered surface of the expanding sleeve, the effect being to expand the expanding sleeve into clamping engagement with the walls of the opening 2 and to contract the contracting sleeve into clamping engagement with the conduit.

The contracting sleeve is provided with a guard shoulder 15 at its inner end.

What I claim as new is:—

1. In a conduit fitting, the combination of a body having a conduit opening; an expansible sleeve in the opening comprising an outer annulus and a slotted inner portion arranged within the opening, the outer annulus having an internal screw thread, said slotted portion being unthreaded and having a tapered inner surface; and a contractible sleeve in the expansible sleeve, said contractible sleeve having slots and a wedging surface engaging the tapered surface of the expansible sleeve and provided with a screw thread operating in the screw thread of the expansible sleeve.

2. In a conduit fitting, the combination of a body having a conduit opening; an expansible sleeve in the opening comprising an outer annulus and a slotted inner portion arranged within the opening, the outer annulus having an internal screw thread, said slotted portion being unthreaded and having a tapered inner surface; and a contractible sleeve in the expansible sleeve, said contractible sleeve having slots and a wedging surface engaging the tapered surface of the expansible sleeve and provided with a screw thread operating in the screw thread of the expansible sleeve and wrench holds on the outer ends of said sleeves.

In testimony whereof I have hereunto set my hand.

GEORGE R. METCALF, JR.